Feb. 18, 1947.   G. A. LYON   2,415,829
ORNAMENTAL WHEEL MEMBER
Filed March 19, 1943

Inventor
GEORGE ALBERT LYON.
by Charles W. Hills Attys.

Patented Feb. 18, 1947

2,415,829

UNITED STATES PATENT OFFICE 2,415,829

ORNAMENTAL WHEEL MEMBER

George Albert Lyon, Allenhurst, N. J.

Application March 19, 1943, Serial No. 479,702

2 Claims. (Cl. 301—37)

This invention relates to an improved wheel structure and is directed more particularly to an improved cover assembly therefor.

In accordance with the features of my invention there is provided herein an ornamental cover assembly including an annulus formed from a sheet material having resiliently elastically flexible characteristics such as that of a synthetic plastic, rubber, synthetic or natural, and having a cross-sectional configuration of such shape and magnitude that when disposed concentrically over the wheel structure it covers the outer surface of the flanges of the tire rim of the wheel structure to constitute in effect a continuation of the side wall of a tire in the tire rim and to give the appearance of being a part of the tire and, when colored white, to give the appearance of being the white sidewall of a massive tire mounted upon a central load bearing structure of minimum diameter.

It will be seen that with such a construction the various appurtenances associated with the tire rim such as wheel balancing weights, the tire valve stem and the like, are entirely concealed behind the cover member and accordingly it is desirable to provide a construction wherein the various aforementioned appurtenances may be rendered accessible for servicing without requiring repeated removal of the cover member from the wheel structure.

To the end that the foregoing advantages may be obtained, and as an important object of my invention, there is provided herein a cover assembly including a peripherally outer portion having the desired resiliently, elastically, flexible characteristics whereby the cover may be locally resiliently, elastically, flexed to render the rear side of the cover member and accessories associated with the tire rim available for servicing.

In accordance with other general features of my invention as embodied in one of the forms shown herein, there is provided a resiliently, elastically, flexible cover member which is provided with a cross-sectional configuration of such shape and magnitude that it may be held securely to the wheel structure by engagement with the edge portion of the tire rim and solely by its own resiliency, this cover member extending radially inwardly over the outer side of the tire rim and radially over a part of the body portion of the wheel structure, the radially inner peripheral margin thereof being removable locally resiliently axially outwardly and away from the body part to flex the cover member and thus render the tire valve and other appurtenances disposed therebehind available for servicing.

Still another object of the invention is to provide for a wheel structure a locally deflectable cover member preferably in the form of an annulus, said cover member being secured to the wheel structure by virtue of a snap-on pry-off engagement with the tire rim thereof and being locally, elastically, resiliently deflectably axially outwardly relative to the wheel structure to render the rear side thereof accessible.

Other objects and advantages of the invention will become apparent from the following description and accompanying drawing in which.

Figure 1:
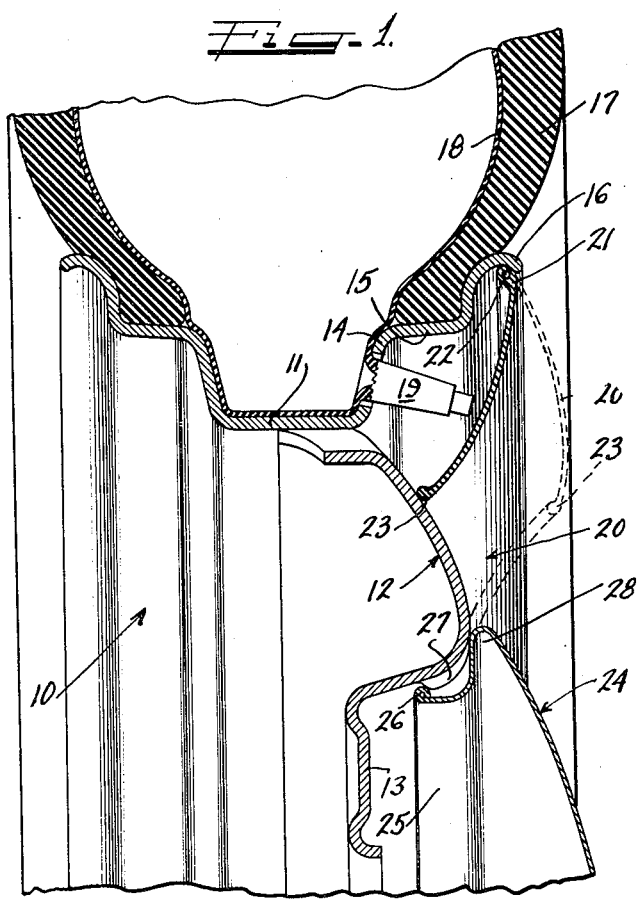
Figure 1 is a fragmentary cross-sectional view of a wheel structure embodying one form of my invention.
Figure 2:
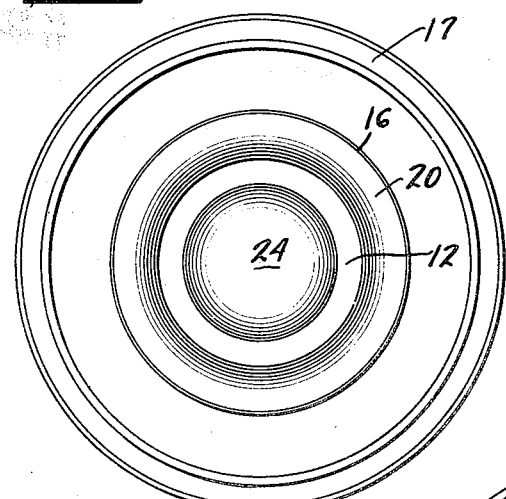
Figure 2 is a side elevational view of the wheel structure.

As shown in Figure 1 the reference character 10 designates generally a multi-flange, drop center type of tire rim which is connected as by riveting or welding or the like through the base flange 11 to a central body part or spider 12 which includes a central bolt-on flange 13. The drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project.

Mounted upon the wheel structure in a manner to be described presently, there is provided a cover assembly including an outer annular cover portion 20 formed from elastically resilient flexible material having a cross-sectional shape and magnitude so as to cover the outer side of the tire rim and constitute in effect a continuation of the side wall of the tire 17 in the rim. The cover portion 20 is provided with a radially outer peripheral beaded edge 21 which may be reinforced by a wire 22 embedded therein, if desired, while the inner peripheral edge of the cover 20 is beaded as shown at 23.

The overall diameter of the cover member 20 is such with respect to the dimensions of the tire rim 10 of the wheel structure over which it is to be disposed that the outer edge 21 may be secured by cam action in snap-on pry-off relationship radially inwardly of the outer extension of the edge portion 16 of the tire rim. When in this position the radially inner beaded edge 23 of the cover member is arranged to bear against the adjacent portion of the outer surface of the body part 12 of the wheel structure thereby to support the cover member 20 transversely in its assembled position.

As shown in dotted lines in Figure 1, access to the rear side of the cover member 20 and thus to the valve stem 19 and other appurtenances associated with the tire rim may be had by manipulation of the inner peripheral edge 23 thereof substantially axially outwardly whereby the nozzle of an air hose may be disposed therebeneath and connected to the terminal end of the valve stem 19. It will be understood that due to the elastic resilient flexible characteristics of the cover member, release of the peripheral edge 23 thereof, after the servicing operation has been completed, will permit the cover to spring back automatically into its normal position shown in solid lines in Figure 1.

The cover assembly may be completed by the disposition of a central crown portion 24 over the bolt-on flange 13. The cover member 24 is provided with a substantially axially inwardly extending snap-on flange 25 terminating in a peripheral snap-on bead 26 which is arranged to be slid axially inwardly over the radially inwardly extending humps 27 formed at the outer surface of the body part 12 of the wheel structure whereby the bead 26 comes to rest on axially inner faces of the humps 27 thus to draw the radially outermost extending part 28 of the crown portion 24 tightly against the adjacent portion of the outer surface of the body part 12 of the wheel structure.

From the foregoing it will be seen that there is provided herein a novel cover assembly for a wheel structure, said assembly being so arranged that a relatively frangible, resiliently, elastically flexible material may be used in the construction thereof.

It will also be seen that there is provided herein, in accordance with one form of my invention, an elastically resilient cover member which may be secured to the wheel structure by virtue of the engagement of the outer peripheral edge thereof with the wheel structure and in which the rear or axially inner surface is rendered accessible by manipulation of the radially inner portion of the cover member.

What is claimed is:

1. In a cover structure for a wheel having a central load bearing portion and a tire rim provided with a radially inwardly curved edge portion, a cover member having an outer portion thereof arranged for detachable engagement with the curled edge portion of the tire rim and an axially and radially inner portion, said cover member having elastic, resilient flexible characteristics to enable it to be manually flexed from said radially inner portion thereof, substantially axially outwardly to render the rear side thereof accessible, said outer portion being pivoted on said curled edge of the tire rim.

2. The cover structure of claim 1 further characterized by the cover member comprising an annulus with a free inner edge readily accessible for manual engagement to deflect the cover member axially outwardly relative to said edge portion of the tire rim in which the outer edge of the cover member pivots during deflection.

GEORGE ALBERT LYON.

REFERENCES CITED

The following references are of record in the file of this patent:

UNITED STATES PATENTS

| Number | Name | Date |
| --- | --- | --- |
| 2,148,995 | Nelson | Feb. 28, 1939 |
| 2,279,330 | Lyon | Apr. 14, 1942 |
| 2,281,529 | Lyon | Apr. 28, 1942 |
| 1,492,438 | Druckenmueller | Apr. 29, 1924 |